US012803934B2

(12) United States Patent
Maman et al.

(10) Patent No.: US 12,803,934 B2
(45) Date of Patent: Nov. 17, 2026

(54) USER-PROGRAMMABLE PACKET FORWARDING

(71) Applicant: MELLANOX TECHNOLOGIES, LTD., Yokneam (IL)

(72) Inventors: Yonatan Liel Maman, Yokneam (IL); Barak Biber, Haifa (IL); Omri Kahalon, Tel-Aviv (IL); Aviad Shaul Yehezkel, Yokneam (IL); Gal Shalom, Givat-Avni (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 296 days.

(21) Appl. No.: 18/608,213

(22) Filed: Mar. 18, 2024

(65) Prior Publication Data

US 2025/0293994 A1 Sep. 18, 2025

(51) Int. Cl.
*H04L 49/00* (2022.01)
*H04L 49/90* (2022.01)

(52) U.S. Cl.
CPC .......... *H04L 49/3018* (2013.01); *H04L 49/90* (2013.01)

(58) Field of Classification Search
CPC ............................ H04L 49/3018; H04L 49/90
See application file for complete search history.

(56) References Cited

U.S. PATENT DOCUMENTS 11,522,773 B1 * 12/2022 Tedesco .................. H04L 63/14
12,067,415 B1 * 8/2024 Coughlan ........... G06F 9/44505
12,395,474 B2 * 8/2025 Deval ................. H04L 63/0485
2019/0281018 A1 * 9/2019 Zhu ......................... H04L 69/22
2023/0224261 A1 * 7/2023 Pope ................... G06F 13/4022 370/392
2024/0031336 A1 * 1/2024 Jindal ................. H04L 63/0428
2026/0067218 A1 * 3/2026 Singh ...................... H04L 47/10

* cited by examiner

*Primary Examiner* — Brian D Nguyen
(74) *Attorney, Agent, or Firm* — Sheridan Ross PC

(57) ABSTRACT

A system for transmitting data is described, among other things. An illustrative system is disclosed to include one or more circuits to perform receive-side scaling (RSS) by receiving a packet, identifying one or more bits in the packet, and forwarding the packet to a receiving queue based on the identified one or more bits in the packet.

20 Claims, 4 Drawing Sheets

USER-PROGRAMMABLE PACKET FORWARDING

FIELD OF THE DISCLOSURE

The present disclosure is generally directed to systems, methods, and devices for processing data and, in particular, for enabling a user-programmable receive-side scaling (RSS) for distributing packets to cores of a central processing unit (CPU).

BACKGROUND

RSS is a network driver technology that enables the efficient distribution of network receive processing across multiple CPUs in multiprocessor systems. With RSS, a network interface card (NIC) is enabled to schedule received data, e.g., data packets, on one or more processors. Conventional RSS utilizes a hash function to ensure that a process that is associated with a given connection stays on an assigned CPU. The NIC implements the hash function, and the resulting hash value provides the means to select a CPU.

SUMMARY

A computing device may include a CPU for executing instructions as well as memory for storing such instructions. The CPU may include n CPU cores. As used herein, the term core generally refers to a basic computation unit of the CPU. The memory may include random access memory (RAM), flash memory, hard disks, solid state disks, optical disks, or any suitable combination thereof. The computing device may also include a NIC or other processing circuit for enabling the computing device to communicate with at least one other computing device, such as an external or otherwise remote device, by way of a communication medium such as a wired or wireless packet network, for example. The computing device may thus transmit data to and/or receive data from the other computing device(s) by way of the NIC. For example, the NIC may be capable of writing received packets to n receive queues for receiving data, e.g., ingress packets, from the other computing device(s).

Generally, a NIC as described herein can steer data flows, e.g., data packets, to any of a number of receive queues by way of RSS. The conventional use of RSS typically includes application of a hash function over the packet headers of received data packets. A table can then be used to map each data packet to a certain receive queue, e.g., based on a corresponding hash value. RSS provides load balancing of network traffic to allow for the distribution of packets over different software queues. As a result, load balancing can be performed over CPU cores because each software queue may be mapped to a CPU core. The CPU cores can then be assigned to work on one or more specific queues in order to enable distributed processing.

As described herein, systems and methods of RSS offloading may enable a user to configure processing circuitry that controls the way RSS distributes traffic across cores of one or more CPUs. The processing circuitry may be installed in the data path and may operate in such a way as to avoid causing latency.

Embodiments of the present disclosure include a computing system, such as a NIC, comprising one or more circuits to: receive a packet; identify one or more bits in the packet; and forward the packet to a receiving queue based on the identified one or more bits in the packet.

Embodiments of the present disclosure also include a method comprising: receiving a packet; identifying one or more bits in the packet; and forwarding the packet to a receiving queue based on the identified one or more bits in the packet.

Aspects of the above computing system and/or method include wherein the one or more circuits are comprised by a network interface controller (NIC).

Aspects of the above computing system and/or method include wherein identifying the one or more bits comprises identifying a protocol associated with the packet.

Aspects of the above computing system and/or method include wherein the receiving queue is associated with a core of a processor, wherein the core is dedicated to processing packets of any protocol, such as UDP or another protocol.

Aspects of the above computing system and/or method include wherein identifying the one or more bits is performed by one of a programmable processing unit, an application-specific integrated circuit (ASIC), and a logic circuit.

Aspects of the above computing system and/or method include wherein the identifying of the one or more bits in the packet is based at least in part on a user-configured algorithm.

Aspects of the above computing system and/or method include wherein identifying the one or more bits comprises calculating a value based on the user-configured algorithm.

Aspects of the above computing system and/or method include wherein the user-configured algorithm is associated with a state.

Aspects of the above computing system and/or method include wherein the user-configured algorithm is configured according to a current CPU use status.

Aspects of the above computing system and/or method include wherein identifying the one or more bits in the packet comprises calculating one or more user-defined functions.

Aspects of the above computing system and/or method include wherein the user-configured algorithm uses one or more hardware metadata registers as an input.

Aspects of the above computing system and/or method include wherein identifying the one or more bits in the packet comprises using one or more hardware components to perform one or more of a checksum calculation and a parsing of layers in the packet. While checksum calculation and layer parsing are used as examples, it should be appreciated that aspects of the above computing system and/or method include identifying the one or more bits in the packet using any type of hardware component.

Aspects of the above computing system and/or method include wherein the receiving queue is one of a plurality of receiving queues, and wherein each receiving queue is associated with a respective core of a processor.

Aspects of the above computing system and/or method include wherein traffic is balanced across a plurality of cores of a processor.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

The present disclosure is described in conjunction with the appended figures, which are not necessarily drawn to scale.

DETAILED DESCRIPTION

Figure 1:
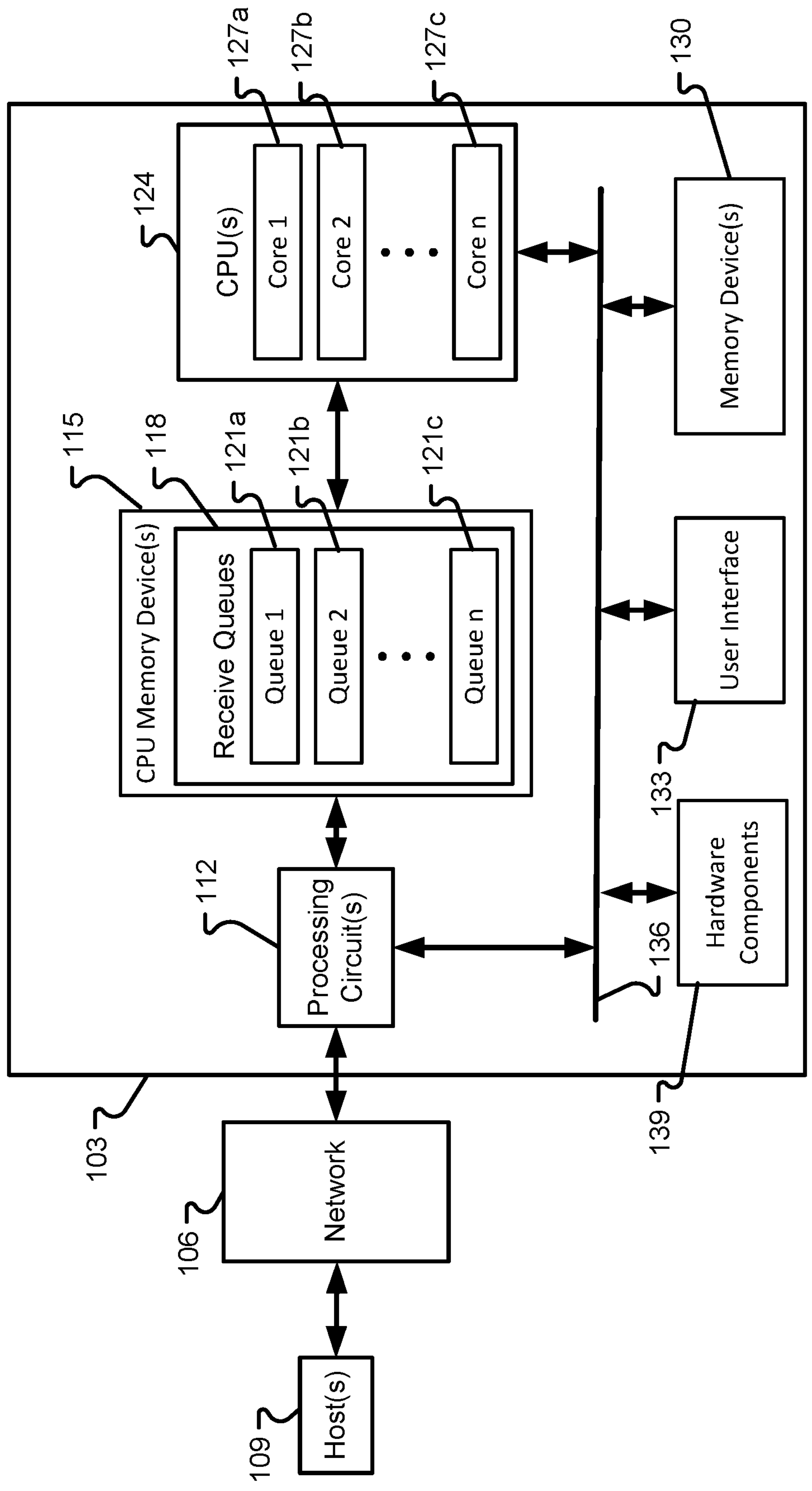
FIG. 1 is a block diagram of a computing environment including a host and a computing device in accordance with one or more of the embodiments described herein.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

The details of one or more aspects of the disclosure are set forth in the accompanying drawings and the description below. Other features, objects, and advantages of the techniques described in this disclosure will be apparent from the description and drawings, and from the claims.

The phrases "at least one," "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as X1-Xn, Y1-Ym, and Z1-Zo, the phrase is intended to refer to a single element selected from X, Y, and Z, a combination of elements selected from the same class (e.g., X1 and X2) as well as a combination of elements selected from two or more classes (e.g., Y1 and Zo).

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The preceding Summary is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages are described herein and will be apparent to those skilled in the art upon consideration of the following Detailed Description and in view of the figures.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

It will be appreciated from the following description, and for reasons of computational efficiency, that the components of the system can be arranged at any appropriate location within a distributed network of components without impacting the operation of the system.

Further, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a printed circuit board (PCB), or the like.

The terms "determine," "calculate," and "compute," and variations thereof, as used herein, are used interchangeably, and include any appropriate type of methodology, process, operation, or technique.

Various aspects of the present disclosure will be described herein with reference to drawings that may be schematic illustrations of idealized configurations.

Any of the steps, functions, and operations discussed herein can be performed continuously and automatically.

Systems and methods of this disclosure are described in relation to a network of computing devices; however, to avoid unnecessarily obscuring the present disclosure, the description omits a number of known structures and devices. Such an omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

A number of variations and modifications of the disclosure can be used. It would be possible to provide for some features of the disclosure without providing others.

References in the specification to "one embodiment," "an embodiment," "an example embodiment," "some embodiments," etc., indicate that the embodiment described may include a particular feature, structure, or characteristic, but every embodiment may not necessarily include the particular feature, structure, or characteristic. Moreover, such phrases may not necessarily refer to the same embodiment. Further, when a particular feature, structure, or characteristic is described in conjunction with one embodiment, it is submitted that the description of such feature, structure, or characteristic may apply to any other embodiment unless so stated and/or except as will be readily apparent to one skilled in the art from the description. The present disclosure, in various embodiments, configurations, and aspects, includes components, methods, processes, systems and/or apparatus substantially as depicted and described herein, including various embodiments, sub combinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving case, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Implementations of the disclosed technology generally pertain to NIC-based adaptive techniques for performing dynamic load distribution among multiple CPU cores. In such implementations, a NIC can effectively and dynamically load-balance incoming data traffic and consequently optimize the full-system performance. As a result, significant improvement may be realized in network processing performance.

Implementations include receiving configurations for the NIC based on user input on a host device and scheduling packets for processing based on the configurations. For example, packets associated with a particular flow may be scheduled to a dedicated core while other packets may be distributed evenly across other cores. Moreover, a NIC may be configured to dynamically adjust rules based on the occurrence of various states or conditions occurring at the host device or within the device containing the NIC. For example, during periods of heavy traffic the NIC may utilize a first set of rules while during more idle periods the NIC may utilize a second set of rules.

The use of a computing device containing one or more CPUs or other processing units as a means to offload computationally intensive tasks from one or more host devices is increasingly important to users such as scientific researchers seeking to execute artificial intelligence (AI) models and other computationally intensive processes. For example, the growing demand for high-performance computing in various domains, including scientific simulations, machine learning, and image processing, has driven the need for efficient and cost-effective computational resources.

By using a system or method as described herein, packets can be dynamically scheduled for processing by a particular core of a CPU of a computing device. The scheduling may be performed by processing circuitry embedded in the data path in such a way as to avoid or mitigate latency caused by conventional methods for processing packets. The scheduling may be performed by the processing circuitry based on instructions configured by a user, such as a user of a host device or an operating system (OS) thread using the computing device to offload tasks. The scheduling may be dynamic in that the scheduling may be performed differently in the event of a particular state being detected.

Reference is made to FIG. 1, showing a nonlimiting block diagram of an exemplary computing environment in accordance with one or more embodiments. The environment may include one or more hosts 109 communicating with a computing device 103 via a network 106.

The computing device 103 may include one or more CPUs 124, one or more processing circuits 112 such as NICs, CPU memory devices 115 containing receive queues 118, a user interface 133, and one or more memory devices 130. Each of the CPUs 124, processing circuits 112, memory devices 130, and user interface 133 may communicate via a bus 136.

The processing circuits 112 of the computing device 103 may include one or more circuits capable of acting as an interface between components of the computing device 103, such as the CPU 124, and the network 106. The processing circuits 112 may enable data transmission and reception such that a host 109 may communicate with the computing device 103. A processing circuit 112 may include one or more of a peripheral component interconnect express (PCIe) card, a USB adapter, and/or may be integrated into a PCB such as a motherboard. The processing circuit 112 may be capable of supporting any number of network protocols such as RDMA, InfiniBand, Ethernet, Wi-Fi, fiber channel, etc.

A processing circuit 112 as described herein may be any device capable of performing RSS by distributing incoming network traffic across multiple processor cores. Such a processing circuit 112 may be integrated within a NIC and/or may include components such as an arithmetic logic unit (ALU) or another type of specialized logic circuitry. The processing circuit 112 may be configured to perform hash computations on any field of an incoming packet, such as source and destination IP addresses and port numbers, to determine how traffic is distributed among the processor cores.

In some implementations, the processing circuit 112 may include RSS function logic which may be configured to execute an RSS algorithm to distribute incoming packets across multiple processor cores 127*a-c* based on computed RSS values. The RSS algorithm may be based on user configuration settings in accordance with implementations described herein.

The processing circuit 112 may include one or more queue management mechanisms to handle the assignment of a packet to a specific processor cores based on a computed RSS value. Each core 127*a-c* may be associated with a dedicated queue 121*a-c* of the receive queues 118 in a CPU memory device 115, though it should be appreciated that at least in some implementations multiple cores 127*a-c* may be associated with a single queue 121*a-c*. For example, two cores 127*a-b* may be associated with one queue 121*a*.

Parameters of the RSS algorithm may be configurable, allowing system administrators and/or users of a host 109 to program the functioning of the RSS and the resulting distribution of traffic. This may be performed in relation to the methods 300, 400, and 500, as described below.

Using a method such as described below in relation to one or more of FIGS. 3-5, processing circuits 112 of a computing device 103 may be capable of scheduling received packets 200 to a particular receive queue 121*a-c* associated with a particular CPU core 127*a-c* based on the bits contained within the received packets 200. In some implementations, the processing circuit(s) 112 may process a header of each received packet to determine an RSS value and, based on the RSS value, schedule each received packet to a particular queue 121*a-c*, from which each packet may be processed using a particular CPU core 127*a-c*.

CPUs 124 of the computing device 103 may each comprise one or more cores 127*a-c* capable of executing instructions and performing calculations. The CPUs 124 may be capable of interpreting and processing data received by the computing device 103 via the processing circuits 112. The cores 127*a-c* of each CPUs 124 may in some implementations each comprise one or more ALUs or other processing circuitry capable of performing arithmetic and/or logical operations, such as addition, subtraction, and bitwise operations. Each CPU 124 may also or alternatively comprise one or more control units (CUs) which may be capable of managing the flow of instructions and data within the CPU 124. CUs of the CPU 124 may be configured to fetch instructions from CPU memory device(s) 115, decode the instructions, and direct appropriate components to execute operations based on the instructions.

A CPU 124 of a computing device 103 may include, for example, a CPU, a reduced instruction set computing (RISC) processor, a complex instruction set computing (CISC) processor, a graphics processing unit (GPU), a digital signal processor (DSP) such as a baseband processor, an application-specific integrated circuit (ASIC), a field-programmable gate array (FPGA), another processor (including those described herein), or any suitable combination thereof.

A CPU 124 as described herein may incorporate multiple processing cores, allowing the CPU 124 to execute multiple instructions simultaneously, and/or may be capable of performing hyperthreading to execute multiple threads concurrently.

The bus 136 of the computing device 103 may be a communication path outside of the data path and may comprise one or more circuits capable of connecting peripheral devices such as the processing circuits 112, CPUs 124, user interface 133 to a motherboard of the computing device 103, as well as one or more memory devices 130. The bus 136 of the computing device 103 may comprise one or more high-speed lanes. Each lane may be, for example, a serial lane, and may consist of a pair of signaling wires for transmitting and/or receiving data. The bus 136 may be, for example, a PCIe bus.

The computing device 103 may comprise one or more memory devices 130, such as non-volatile memory express (NVMe) solid-state drives (SSDs). The memory devices 130 may be capable of providing fast and efficient data access and storage. Each of the processing circuits 112, CPU 124, and user interface 133 may be capable of sending data to and reading data from the memory devices 130 via the bus 136. Each of the processing circuit 112 and the CPU 124 may also comprise one or more dedicated memory devices such as the CPU memory device(s) 115.

The computing device 103 may also comprise one or more hardware components 139. While illustrated as being a separate device connected to other elements via a bus 136, the hardware component 139 may be a component of a NIC of the computing device 103. A hardware component 139 as described herein may include circuits capable of performing functions such as calculating a checksum, parsing layers in packets, and other functions. Hardware components 139 may be configured to write data to and/or read data from a memory device 130. Data written by a hardware component 139 may be referred to as a hardware metadata register. In some implementations of the systems and methods described herein, a processing circuit 112 may operate in accordance with a user-configured algorithm which may use one or more hardware metadata registers as an input. For example, the processing circuit 112 may be capable of determining an RSS score based on one or both of data within a packet as well as data within a memory device 130 such as contents of one or more hardware metadata registers.

A user interface 133 of the computing device 103 may be or comprise a keyboard, mouse, trackball, display, touchscreen, and/or any other device for receiving information from a user and/or for providing information to a user. The user interface 133 may be used, for example, to receive a user selection or other user input regarding any step of any method described herein. Notwithstanding the foregoing, any required input for any step of any method described herein may be generated automatically by the computing device 103 (e.g., by a CPU 124 or another component of the computing device 103) or received by the computing device 103 from a source external to the computing device 103, such as a host 109.

Although the user interface 133 is shown as part of the computing device 103, in some implementations, the computing device 103 may utilize a user interface 133 that is housed separately from one or more remaining components of the computing device 103. In some implementations, the user interface 133 may be located proximate one or more other components of the computing device 103, while in other implementations, the user interface 133 may be located remotely from one or more other components of the computing device 103. For example, the computing device 103 may receive instructions from a host 109 for configuring the processing circuits 112 to implement particular RSS scheduling as described below.

The one or more hosts 109 may connect to the computing device 103 to access CPU computing resources as well as to configure the RSS scheduling performed by the processing circuits 112 via the network 106. The hosts 109 may be, for example, client devices such as personal computers, laptops, smartphones, and Internet of Things (IoT) devices, capable of sending data to and receiving data from the computing device 103 over the network 106.

Each of the hosts 109 may comprise network interfaces including, for example, a transceiver. Each host 109 may be capable of receiving and transmitting packets in conformance with applicable protocols such as TCP, although other protocols may be used. Each host 109 can receive and transmit packets to and from the computing device 103 via the network 106. In some implementations, one or more hosts 109 may be switches, proxies, gateways, load balancers, etc. Such hosts 109 may serve as intermediaries between other hosts 109 and the computing device 103.

In some implementations, one or more hosts 109 may be IoT devices, such as sensors, actuators, and/or embedded systems, connected to the network 106. Such IoT devices may act as clients, servers, or both, depending on implementations and the specific IoT applications. For example, a first host 109 may be a smart thermostat acting as a client and a second host 109 may be a central server for analysis or a smartphone executing an app.

The network 106 may rely on various networking hardware and protocols to establish communication between the hosts 109 and the computing device 103. Such infrastructure may include one or more routers, switches, and/or access points, as well as wired and/or wireless connections.

The network 106 may be, for example, a local area network (LAN) connecting hosts 109 with the computing device 103. A LAN may use Ethernet or Wi-Fi technologies to provide communication between the hosts 109 with the computing device 103.

In some implementations, the network 106 may be, for example, a wide area network (WAN) and may be used to connect hosts 109 with the computing device 103. A WAN may comprise, for example, one or more of lines, satellite links, and/or cellular networks. WANs may use various transmission technologies, such as leased lines, satellite links, or cellular networks, to provide long-distance communication. A TCP connection over a WAN may be used, for example, to enable hosts 109 to communicate reliably with the computing device 103 across vast distances.

In some implementations, the network 106 may comprise the Internet, one or more mobile networks, such as 4G, 5G, LTE, virtual networks, such as a VPN, or some combination thereof.

Figure 2:
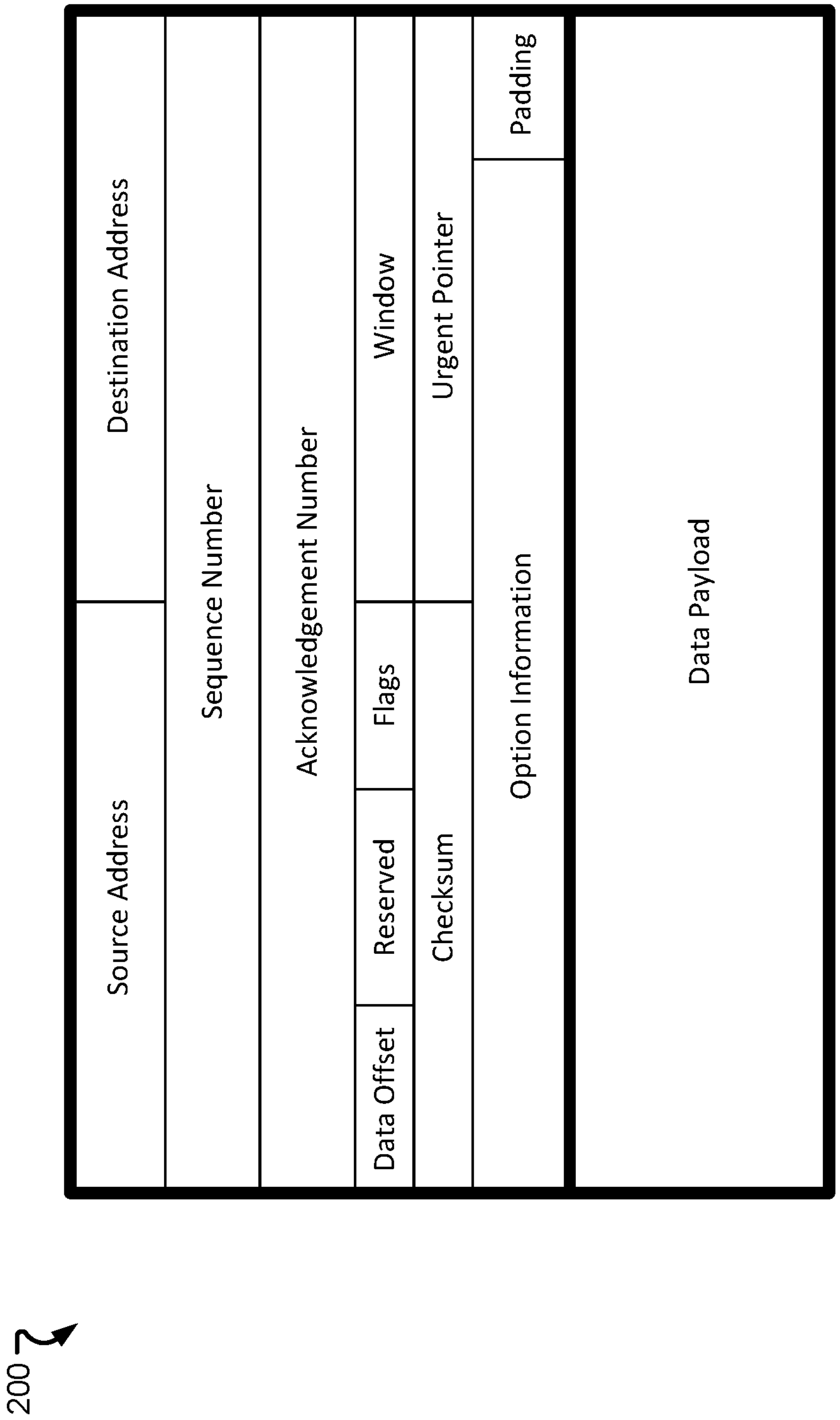
FIG. 2 is a block diagram of a packet in accordance with one or more of the embodiments described herein.

Data sent between the hosts 109 and the computing device 103 over the network 106 may utilize a protocol such as TCP. In some implementations, when sending data over the network 106, a connection may be established between a particular host 109 and the computing device 103. Once the connection is made, data may be exchanged in the form of packets, such as a packet 200 as illustrated in FIG. 2.

As should be appreciated, the hosts 109 may be client devices and may encompass a wide range of devices, including desktop computers, laptops, smartphones, IoT devices, etc. Such hosts 109 may execute one or more applications which communicate with the computing device 103 to access computing resources or services. For example, a host 109 may execute an application which may utilize the CPU 124 of the computing device 103 for performing computationally intensive tasks. The host 109 may communicate with the computing device 103 with packets to be handled by the CPU 124. The computing device 103 may process the packets and may respond with a result of the processing to the host 109 or to another device. Applications running on the host 109 may be responsible for initiating communication with the computing device 103, making requests for resources or services, and processing data received from the computing device 103. The network 106 may enable the computing device 103 to communicate any number of concurrent communications with any number of hosts 109 simultaneously.

It should also be appreciated that in some implementations, the systems and methods described herein may be executed without a network 106 connection. For example, one or more hosts 109 may be capable of communicating directly with the computing device 103 without relying on any particular network 106. In some implementations, the host 109 and computing device 103 may be a part of a single computing system.

Each of the cores 127*a-c* of one or more CPUs 124 of the computing device 103 may be responsible for processing instructions and managing data communication within the computing device 103. To effectively handle incoming and outgoing data, the CPUs 124 may utilize one or more receive queues 118, which may be stored in, for example, one or more CPU memory devices 115 or device memory 112, each of which may be capable of storing data temporarily before the data is processed or transmitted.

The CPU receive queues 118 may include a plurality of queues 121*a-c*. In some implementations each queue 121*a-c* may be associated with a particular core 127*a-c* of a particular CPU 124. Each receive queue 121*a-c*, may be used by the processing circuit(s) 112 to store incoming data packets from hosts 109 until the respective core 127*a-c* of the CPU 124 is ready to process the packets.

The processing circuit 112 may comprise or be in communication with one or more memory devices 130. The memory devices 130 may be used to store rules and/or instructions for the operation of the processing circuits 112. As described in greater detail below, rules and/or instructions for the operation of the processing circuits 112 may be programmed by a user by interacting with a user interface 133 of the computing device 103 or by interacting with a host 109.

The memory devices illustrated in FIG. 1 may include, for example, main memory, disk storage, NIC memory, or any suitable combination thereof. The memory and/or storage devices may include, but are not limited to, any type of volatile or nonvolatile memory such as dynamic random access memory (DRAM), static random access memory (SRAM), erasable programmable read-only memory (EPROM), electrically erasable programmable read-only memory (EEPROM), Flash memory, solid-state storage, etc.

The memory device(s) 130 of the computing device 103 may store instructions such as software, a program, an application, or other executable code for causing at least any of the processing circuit(s) 112, user interface 133, and CPU 124 to perform, alone or in combination, any one or more of the methods discussed herein. The instructions may in some implementations reside, completely or partially, within at least one of the memory devices illustrated in FIG. 1, or any suitable combination thereof.

In some embodiments, the electronic device(s), network (s), system(s), chip(s), circuit(s), or component(s), or portions or implementations thereof, of FIGS. 1 and 2, or some other figure herein, may be configured to perform one or more processes, techniques, or methods as described herein, or portions thereof. Such processes may be as depicted in FIGS. 3-5 and as described below.

An example packet 200 is illustrated in FIG. 2. A packet as may be received by a computing device 103 may encapsulate data structured in a particular format composed of multiple fields. Each field may serve a specific function essential for the reliable transmission of data over the network 106. The packet may comprise a number of bits and each bit may be associated with a particular field. The association of a bit to a field may depend on a particular protocol of the packet. For example, a TCP packet may contain a certain number of fields while a UDP packet may contain a different number of fields. Such fields may include, for example, 16 bits of a source address specifying a port number of an application on the host 109 sending the packet, 16 bits of a destination address specifies a port number of an application on a receiving host 109, 32 bits of a sequence number which may be used for data reordering and ensuring data integrity, 32 bits of an acknowledgment number, four bits of a data offset, six reserved bits, six bits indicating flags, sixteen bits of a window field, sixteen checksum bits, sixteen urgent pointer bits, one or more options bits, one or more padding bits, and one or more payload bits.

Figure 3:
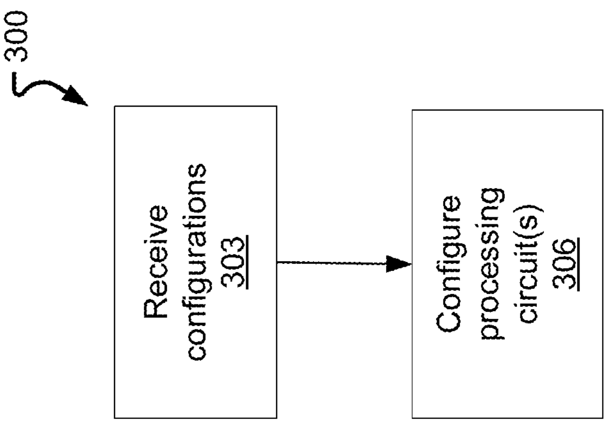

FIG. 3 is a flow diagram illustrating an example of a computer-implemented method 300 of configuring a processing circuit 112 to perform RSS in accordance with certain implementations of the present disclosure. At 303, a computing device 103 may receive configuration settings for a processing circuit 112 of the computing device 103.

Receiving configuration settings may comprise receiving data from a host 109 or receiving input from a user interface 133. For example, a host 109 or the computing device 103 itself may be configured to execute a user space program or application which may enable a user to configure the calculation of an RSS value by the processing circuit 112 of the computing device 103.

In some implementations, a user may create or load a program which may instruct the processing circuit 112 to calculate an RSS value for packets in a particular way. Such a program may be, for example, an RISC-v or x86 program. A user may also or alternatively be enabled to select a program to run or to select one or more fields of packets to be used by the processing circuit 112 when calculating the RSS value.

After receiving configuration settings, the computing device 103 may configure the processing circuit(s) 112 in the data path to implement RSS value calculations based on the configuration settings at 306. In some implementations, configuring a processing circuit 112 to implement RSS value calculations based on configuration settings may comprise loading a program into a memory device 130, or a CPU memory devices 115 such as CPU dma memory, readable by the processing circuit 112 which may be used by the processing circuit 112 to perform the RSS value calculations.

The process of calculating an RSS value which may be performed by a processing circuit 112 based on received configuration settings may be as described below in regards to the method 400 of FIG. 4.

Figure 4:
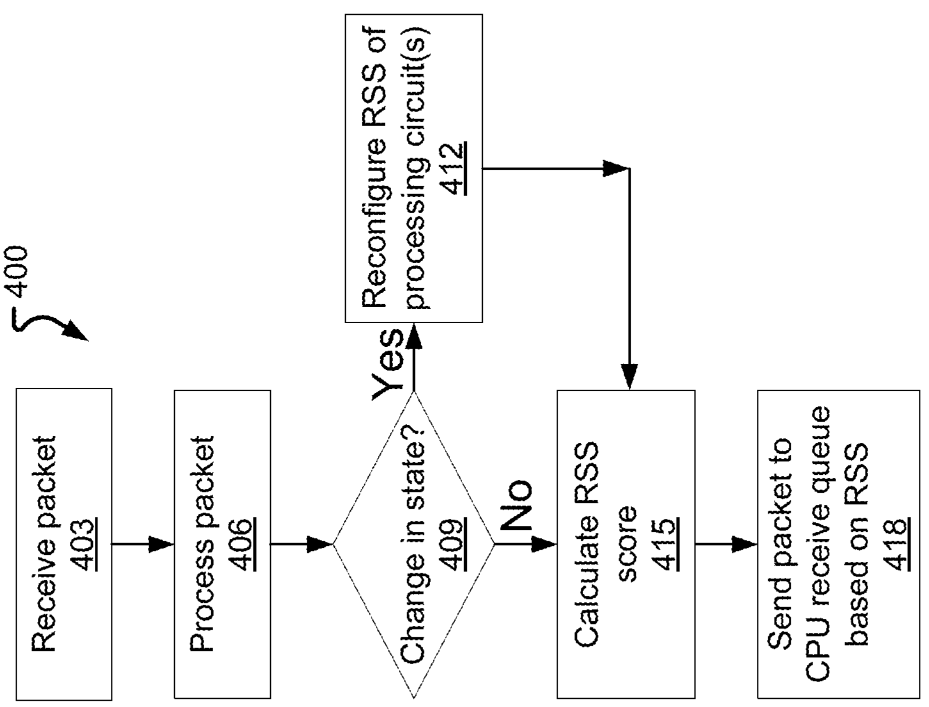
FIGS. 3-5 are flowcharts of methods in accordance with one or more of the embodiments described herein.

FIG. 4 is a flow diagram illustrating an example of a computer-implemented method 400 performed by a processing circuit 112 of a computing device 103 to forward received packets to particular CPU cores of the computing device 103 based on an RSS calculation in accordance with certain implementations of the present disclosure. At 403, the processing circuit 112 may receive a packet.

The packet received by the processing circuit 112 may first be received by a port of the computing device 103 before reaching the processing circuit 112 along the data path. As described above, the processing circuit 112 may be configured based on user-defined configuration settings to perform RSS score calculations and to forward packets to particular CPU cores based on the RSS score.

At 406, the processing circuit 112 may process the packet according to current configuration settings and/or current state(s) of the processing circuit 112. Both the configuration settings of the processing circuit 112 and the current state of one or more components of the computing device 103 may cause the processing circuit 112 to process the packet in a particular way.

Examples of configuration settings for a processing circuit 112 include causing the processing circuit to identify a protocol associated with each packet, calculate the RSS score based on a user-defined function, extracting bits from a packet and using the bits as inputs to a program such as a RISC-v or x86 program, using one or more hardware components to perform an operation such as a checksum calculation and/or a parsing of layers in the packet, using data from one or more hardware metadata registers as an input to a program or algorithm, or some combination thereof. Such examples should be considered as being for illustration purposes only and should not be considered as limiting the present disclosure to any of the listed examples.

The processing of a packet may also or alternatively depend on one or more current states of the processing circuit. The state of the processing circuit may vary over time. For example, a packet may cause the state of the processing circuit to update.

Based on the configuration settings, the processing circuit 112 may process the received packet by, for example, identifying one or more bits in particular fields of the received packet based on the configuration settings, performing a lookup of one or more hardware registers, and/or otherwise acquiring data which may be used to calculate the RSS score.

Based on the acquired data, whether data from the received packet, data from hardware metadata registers, or other sources, the processing circuit 112 may in some implementations perform additional data lookups. For example, the processing circuit 112 may be enabled to identify a protocol associated with the packet, to control a hardware component to perform a function such as a checksum calculation and a parsing of layers in the packet. Processing the packet may involve receiving an output from a function of a hardware component such as a checksum calculation and/or a parsing of layers in the packet.

At 409, a determination may be made as to whether the packet received at 403 has caused or should cause a change in state of one or more components of the computing device 103. As described below in relation to FIG. 5, the configuration settings for a processing circuit may be adaptive to workload or to other states by executing a method 500. A state or workload may be associated with a particular RSS algorithm or a particular set of configuration settings.

A state as described herein may be a state of a component of the computing device 103 or may be based on data received from a host 109. For example, a host 109 may be enabled to select a state which may cause configuration settings of the processing circuit 112 to change. As another example, configuration settings of the processing circuit 112 may change based on a status of a CPU 124. For example, if a number of entries in one receive queue 121*a-c* associated with a particular core 127*a-c* exceeds a maximum threshold, distribution of packets can be controlled by the processing circuit 112 to other cores 127*a-c*.

In some implementations, a memory device 130 may contain a number of user-configured algorithm and/or configuration settings for a processing circuit 112. Each algorithm and/or configuration setting may be associated with a particular state.

At 409, the processing circuit 112 may detect the packet received at 403 has caused or should cause a change in state. The detection of a change in state may be made by the processing circuit 112 itself, such as by polling various memory locations and/or receiving instructions from a host or may be performed by a CPU 124 or other processing circuitry capable of detecting changes in states or workloads.

At 412, upon detecting the state change, the processing circuit 112 may be configured to switch to an algorithm and/or configuration setting associated with the state and reconfigure the RSS of the processing circuit such that RSS scores will be calculated according to the algorithm and/or configuration setting associated with the state.

At 415, the processing circuit 112 may calculate an RSS score using the data acquired through the processing of the packet at 406. Calculating the RSS score may be based at least in part on a user-configured algorithm. For example, the processing circuit 112 may be configured to calculate an RSS score based on a user-configured algorithm.

Calculating an RSS score may involve inputting data acquired at 406 into one or more user-defined functions or equations. In some implementations, the data acquired at 406 may be input into a software application such as a RISC-v or x86 program.

In some implementations, calculating an RSS score may involve determining a protocol associated with the received packet or identifying a flow with which the packet is associated. The calculation of the RSS score may be made based on any of the data acquired at 406, such as contents of one or more fields of the packet, data from hardware components or registers, or other data.

In some implementations, the calculation of the RSS score may be made based on protocol fields in packets that are not supported by the hardware of the computing device 103. For example, if in the future a new protocol is invented that is not supported in the hardware packets using the protocol can be controlled using this mechanism. Conventional RSS requires specifying certain fields and only the specified fields can be used for determining an RSS score. For this reason, the systems and methods described herein provide a benefit as compared to conventional RSS in that users may be enabled to decide what bits in the packets or other data to use for RSS.

At 418, based on the calculated RSS score, the packet may be forwarded to a receiving queue 121*a-c* based on the RSS score. Because each receive queue 121*a-c* may be associated with a particular CPU core 127*a-c*, the processing circuit 112 may decide to which core the packet will route based on the RSS result. The packet may then be processed by the CPU core 127*a-c* associated with the receiving queue 121*a-c* to which the packet was forwarded.

In some implementations, each receive queue 121*a-c* may be associated with a particular RSS score or a particular range of RSS scores. When the processing circuit 112 determines a particular RSS score for a packet, the processing circuit 112 may filter the packet to a corresponding receive queue 121*a-c*.

Using a system or method as described herein, specific cores can be dedicated to one or more specific packet protocols and/or flows. This enables a computing device 103 to give a high priority to certain packets such as ones that need low latency. Users can control the computing device 103 to give such packets priority by providing configuration settings to the computing device 103 such that only the certain packets requiring a low latency are routed to one particular CPU core 127*a-c* or to a group of cores 127*a-c*. As an example, such instructions may indicate all UDP packets should be forwarded to queue 1 121*a* and all other packets should be forwarded to any one of the other queues 121*b-c*.

As a result of using the systems and methods described herein, traffic may be balanced across a plurality of cores 127*a-c* of a CPU 124 based on RSS scores.

Figure 5:
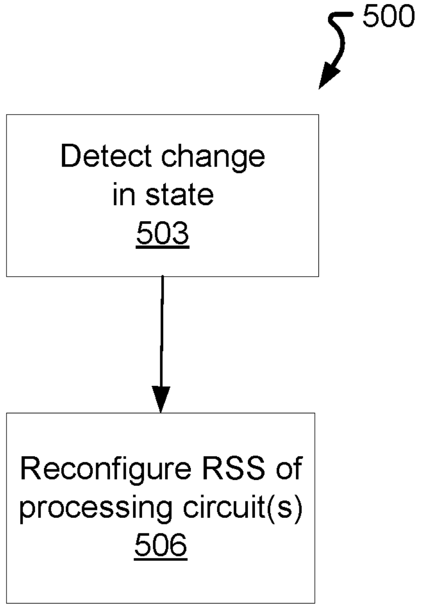

As illustrated in FIG. 5, the configuration settings for a processing circuit may be adaptive to workload or to other states by executing a method 500. A state or workload may be associated with a particular RSS algorithm or a particular set of configuration settings.

At 503, the processing circuit 112 may detect a change in state. The detection of a change in state may be made by the processing circuit 112 itself, such as by polling various memory locations and/or receiving instructions from a host or may be performed by a CPU 124 or other processing circuitry capable of detecting changes in states or workloads. As described above in relation to FIG. 4, the state may change as a result of receiving a packet which is to be sent to a CPU receive queue based on RSS.

At 506, upon detecting the state occurring, the processing circuit 112 may be configured to switch to an associated algorithm and/or configuration setting and calculate RSS scores according to the associated algorithm and/or configuration setting. Such a method provides a non-uniform RSS distribution which provides enhanced capabilities as compared to conventional RSS mechanisms.

The present disclosure encompasses embodiments of the method 400 that comprise more or fewer steps than those described above, and/or one or more steps that are different than the steps described above.

The present disclosure encompasses methods with fewer than all of the steps identified in FIGS. 3-5 (and the corresponding description of the methods 300, 400, and 500), as well as methods that include additional steps beyond those identified in FIGS. 3-5 (and the corresponding description of the methods 300, 400, and 500). The present disclosure also encompasses methods that comprise one or more steps from one method described herein, and one or more steps from another method described herein. Any correlation described herein may be or comprise a registration or any other correlation.

It is to be appreciated that any feature described herein can be claimed in combination with any other feature(s) as described herein, regardless of whether the features come from the same described embodiment.

What is claimed is:

1. A system comprising one or more circuits to:
receive a packet;
process one or more bits of the packet by using the one or more bits of the packet as an input to an algorithm;
calculate, using the algorithm, an RSS score; and
forward the packet to a receiving queue based on the RSS score calculated using the one or more bits of the packet as the input to the algorithm.

2. The system of claim 1, wherein the one or more circuits are comprised by a network interface controller (NIC).

3. The system of claim 1, wherein processing the one or more bits comprises identifying a protocol associated with the packet.

4. The system of claim 1, wherein the receiving queue is associated with a core of a processor, wherein the core is dedicated to processing packets.

5. The system of claim 1, wherein processing the one or more bits is performed by one of a programmable processing unit, an application-specific integrated circuit (ASIC), and a logic circuit.

6. The system of claim 1, wherein the algorithm comprises a user-configured algorithm.

7. The system of claim 6, wherein processing the one or more bits comprises calculating a value based on the user-configured algorithm.

8. The system of claim 6, wherein the user-configured algorithm is associated with a state.

9. The system of claim 6, wherein the user-configured algorithm is configured according to a current CPU use status.

10. The system of claim 6, wherein calculating the RSS score comprises executing one or more user-defined functions using the one or more bits as an input.

11. The system of claim 6, wherein the user-configured algorithm uses one or more hardware metadata registers as an input.

12. The system of claim 11, wherein traffic is balanced across a plurality of cores of a processor by processing bits of each packet of the traffic using the algorithm, calculating a respective RSS score for each packet of the traffic, and forwarding each packet of the traffic to one of a plurality of receiving queues based on the respective RSS score.

13. The system of claim 6, wherein processing the one or more bits comprises using one or more hardware components to perform one or more of a checksum calculation and a parsing of layers in the packet.

14. The system of claim 1, wherein the receiving queue is one of a plurality of receiving queues, and wherein each receiving queue is associated with a respective core of a processor.

15. A network interface controller (NIC) comprising one or more circuits to:

receive a packet;

process one or more bits of the packet by using the one or more bits of the packet as an input to an algorithm;

calculate, using the algorithm, an RSS score; and forward the packet to a receiving queue based on the RSS score calculated using the one or more bits of the packet as the input to the algorithm.

16. The NIC of claim 15, wherein processing the one or more bits comprises identifying a protocol associated with the packet.

17. The NIC of claim 15, wherein the receiving queue is associated with a core of a processor, wherein the core is dedicated to processing UDP packets.

18. The NIC of claim 15, wherein processing the one or more bits is performed by one of a programmable processing unit, an application-specific integrated circuit (ASIC), and a logic circuit.

19. The NIC of claim 15, wherein the algorithm is a user-configured algorithm.

20. A method comprising:

receiving a packet;

processing one or more bits of the packet by using the one or more bits of the packet as an input to an algorithm;

calculating, using the algorithm, an RSS score; and forwarding the packet to a receiving queue based on the RSS score calculated using the one or more bits of the packet as the input to the algorithm.

* * * * *